United States Patent [19]

Baumoel

[11] Patent No.: US 6,273,373 B1
[45] Date of Patent: Aug. 14, 2001

[54] DEVICE FOR CLAMPING A TRANSDUCER TO A PIPE

[76] Inventor: Joseph Baumoel, 104 Fairway View Dr. The Hamlet, Commack, NY (US) 11725

[*] Notice: Subject to any disclaimer, the term of this patent is extended or adjusted under 35 U.S.C. 154(b) by 0 days.

[21] Appl. No.: 09/329,722

[22] Filed: Jun. 10, 1999

Related U.S. Application Data

[60] Provisional application No. 60/089,475, filed on Jun. 16, 1998.

[51] Int. Cl.[7] ........................................ F16L 3/00
[52] U.S. Cl. ................................ 248/73; 248/74.1
[58] Field of Search ........................ 248/73, 218.4, 248/219.2, 229.17, 228.8, 230.8, 74.1; 73/861.18, 861.28

[56] References Cited

U.S. PATENT DOCUMENTS

| | | | | | |
|---|---|---|---|---|---|
| 2,833,423 | * | 5/1958 | Tucker | ................................ | 212/179 |
| 3,480,270 | * | 11/1969 | Gill | ...................................... | 269/131 |
| 3,525,158 | * | 8/1970 | Torlay | ..................................... | 33/661 |
| 4,019,373 | * | 4/1977 | Freeman et al. | ....................... | 73/644 |

* cited by examiner

Primary Examiner—Anita M. King
Assistant Examiner—Holly N. Sy
(74) Attorney, Agent, or Firm—F. Chau & Associates, LLP; James J. Bitetto

(57) ABSTRACT

An apparatus for clamping and aligning an object to a cylinder includes a retainer for attaching to the object. The retainer includes an attachment device for detachably receiving a flexible retaining member, and a collar disposed on an opposite side of the retainer. A threaded rod includes a first end portion. The first end portion is adapted to receive a first end of the flexible retaining member. The threaded rod is attached to and is transversely disposed to a spindle such that the first end portion extends beyond the spindle. The spindle is received in the collar to provide a hinged connection between the retainer and the threaded rod. A knob is included for threadedly engaging a second end portion of the threaded rod. A washer is disposed between the knob and the collar such that when the knob is adjusted the flexible member is tightened around the cylinder to self align the object, and the threaded rod is pivoted about the collar to form substantially equal angles between the flexible member and the cylinder on opposite sides of the object.

30 Claims, 3 Drawing Sheets

DEVICE FOR CLAMPING A TRANSDUCER TO A PIPE

CROSS REFERENCE TO RELATED APPLICATION

This application claims priority to Provisional Application Ser. No. 60/089,475 filed Jun. 16, 1998 which is incorporated herein by reference.

BACKGROUND OF THE INVENTION

1. Field of the Invention

This invention relates generally to clamping devices, and, more particularly to a clamping device that clamps a transducer to a pipe using a modified turnbuckle assembly that assures self alignment of the transducer.

2. Discussion of Related Art

The measurement of flow rate within a pipe is important for purposes of maintenance and management of pipeline systems. It is known that an ultrasonic signal can be diagonally passed through the fluid in the pipe to measure fluid flow without intrusion into the pipe. The ultrasonic signal is transmitted from a first transducer and received by a second transducer. In operation, an ultrasonic signal is transmitted from an upstream (with regard to the direction of fluid flow within the pipe) transducer to a downstream transducer and from the downstream transducer to the upstream transducer. In each case, the time between transmission and reception of the ultrasonic signal is measured. The velocity of the fluid flow $V_F$ through the pipe can be determined by the equation:

$$V_F = Kc \frac{\Delta t}{TL} \quad (1)$$

wherein Kc is a dimensioned constant(vol/time) related to the pipe, ($\Delta t$) is the difference between the downstream and the upstream transit times, and TL is the average transit time through the fluid.

However, the effect of the fluid flow on the transit times of the downstream and upstream signal is small, so it is essential that an accurate measurement of transit times is made. To determine the transit time of the signal, a phase difference between a reference signal and the received signal may be utilized. Yet, to measure phase difference, the same cycle of the reference and received signals (e.g., a first reference cycle and a first received cycle) should be compared. A comparison between different cycles of the reference and received signals results in misregistration between the reference and the received signal. Misregistration results in a large measurement error in the transit time because the transmitted ultrasonic signal has a relative low time resolution when compared to the upstream/downstream transit times. The ultrasonic signal typically has a period of from hundreds to thousands of nanoseconds while the upstream/downstream transit times are typically from picoseconds to a few nanoseconds. Accordingly, misregistration (e.g., of either the upstream or downstream signal) results in an error in the measurement of the transit time for the misregistered signal (e.g., either downstream or upstream signals) that is much larger than the transit time itself.

In practice, the setup conditions of the transducers including the pipe material, wall thickness, fluid flow rate, etc., affect the received ultrasonic signal. In addition, the beginning of the received signal does not arrive with a sharp leading edge, but rather there is a gradual buildup of the received signal. This is due to a high "Q" (resonance) of the ultrasonic transducer (transmitter) and due to sonic resonance of the pipe wall or other structure through which the ultrasonic signal passes to enter and leave(on the receiving transducer side) the fluid flow.

Clamping such transducers to a respective pipe typically requires a tedious and time consuming procedure. For example, 5 brackets are commonly used to assure that each transducer is properly aligned with the pipe. However, to assure proper alignment, the clamping procedure using brackets takes several minutes or more. In addition, different sized brackets are required depending on the circumference of the pipe.

It is therefore an object of the present invention to overcome the deficiencies of the prior art. Therefore, a need exists for a clamping device for aligning and clamping a transducer to a pipe. A further need exists for a clamping device which is capable of attaching a transducer to a pipe of any size. A still further need exists for a clamping device which is capable of being used for quick, easy and accurate installation on a pipe.

SUMMARY OF THE INVENTION

An inventive turnbuckle assembly is disclosed that quickly clamps a transducer to a pipe of any size. The assembly includes a threaded rod, a threaded knob, a washer, a rotatable spindle and a collar having an opened hook. In addition, assembly includes a fixed end nut having a closed hook for securing a link of a ladder chain that is placed around the pipe. When the knob is rotated clockwise, force is applied on the rotatable spindle.

The position of the chain on the open hook is substantially on the same plane as the center axis of rotatable spindle, so that the alignment of the transducer on the pipe is ensured. Further, the rotation of the spindle will assure that the chain's angle to the pipe is substantially equal on both sides of the pipe.

In accordance with the present invention, an apparatus for clamping and aligning an object to a cylinder includes a retainer for attaching to the object. The retainer includes an attachment device for detachably receiving a flexible retaining member, and a collar disposed on an opposite side of the retainer. A threaded rod includes a first end portion. The first end portion is adapted to receive a first end of the flexible retaining member. The threaded rod is attached to and is transversely disposed to a spindle such that the first end portion extends beyond the spindle. The spindle is received in the collar to provide a hinged connection between the retainer and the threaded rod. A knob is included for threadedly engaging a second end portion of the threaded rod. A washer is disposed between the knob and the collar such that when the knob is adjusted the flexible member is tightened around the cylinder to self align the object, and the threaded rod is pivoted about the collar to form substantially equal angles between the flexible member and the cylinder on opposite sides of the object.

Another apparatus for clamping and aligning a transducer to a pipe includes a retainer having attachment means for attaching the retainer of the transducer. The retainer includes a hook for detachably receiving a chain, and the retainer further includes a collar disposed on an opposite side of the retainer relative to the hook. A threaded rod has a first end portion, and the first end portion is adapted to receive a first end of the chain. The threaded rod is attached to and transversely disposed relative to a spindle such that the first end portion extends beyond the spindle and receives a nut for rotatably securing the threaded rod to the collar. The spindle is received in the collar to provide a hinged connection between the retainer and the threaded rod. A knob for threadedly engaging a second end portion of the threaded rod is provided. A washer is disposed between the knob and the collar such that when the knob is adjusted the chain is tightened around the pipe to self align the transducer, and the threaded rod is pivoted about the collar for rotating in accordance with tension in the chain such that substantially equal angles are formed between the chain and the pipe on opposite sides of the transducer.

In alternate embodiments, the object may be a transducer. The cylinder may include a pipe, and the flexible retaining member may include a chain. The flexible retaining member is preferably a ladder chain. The attachment member may include a hook for passing through and retaining a link of the chain. The retainer may be secured to a top surface of the object. The threaded rod may be disposed substantially perpendicular to the spindle.

The object contacts the cylinder at a contact point, and the contact point forms a tangential plane relative to the cylinder. The attachment member preferably includes a point of attachment for the flexible member at a location which is substantially coplanar with an axis of rotation provided by the spindle, and the axis of rotation of the spindle and the point of attachment for the flexible member preferably form a second plane substantially parallel to the tangential plane.

A method for clamping and aligning an object to a cylinder includes the steps of:

providing an apparatus including a retainer for attaching to the object, the retainer including an attachment device for detachably receiving a flexible retaining member and a collar disposed on an opposite side of the retainer, a threaded rod having a first end portion, the first end portion adapted to receive a first end of the flexible retaining member, the threaded rod attached to and transversely disposed to a spindle such that the first end portion extends beyond the spindle, the spindle being received in the collar to provide a hinged connection between the retainer and the threaded rod, a knob for threadedly engaging a second end portion of the threaded rod and a washer disposed between the knob and the collar such that when the knob is adjusted the flexible member is tightened around the cylinder to self align the object, and the threaded rod is pivoted about the collar to form substantially equal angles between the flexible member and the cylinder on opposite sides of the object;

attaching the first end of the flexible retaining member to the first end portion of the threaded rod;

wrapping the flexible retaining member about the cylinder;

attaching a second portion of the flexible retaining member to the attachment device; and adjusting the knob to secure and align the object to the cylinder.

In alternate methods the cylinder may include a pipe, the object may include a transducer, and the flexible retaining member may include a chain. The step of wrapping the flexible retaining member about the cylinder may include the step of removing slack from the flexible retaining member before the step of attaching the second portion of the flexible retaining member to the attachment device. The step of wrapping the flexible retaining member about the cylinder may include the step of adjusting a length of the flexible retaining member to accommodate a plurality of different size cylinders.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

The present invention relates generally to clamping devices for clamping transducers to a pipe or other flow ducts. The present invention is adjustable to accommodate any size pipe. The clamping device includes an assembly that advantageously assures self alignment of the transducer. In a preferred embodiment, the present invention is employed to attach portable transducer systems to a pipe in a fast easy and accurate manner.

Figure 1A:
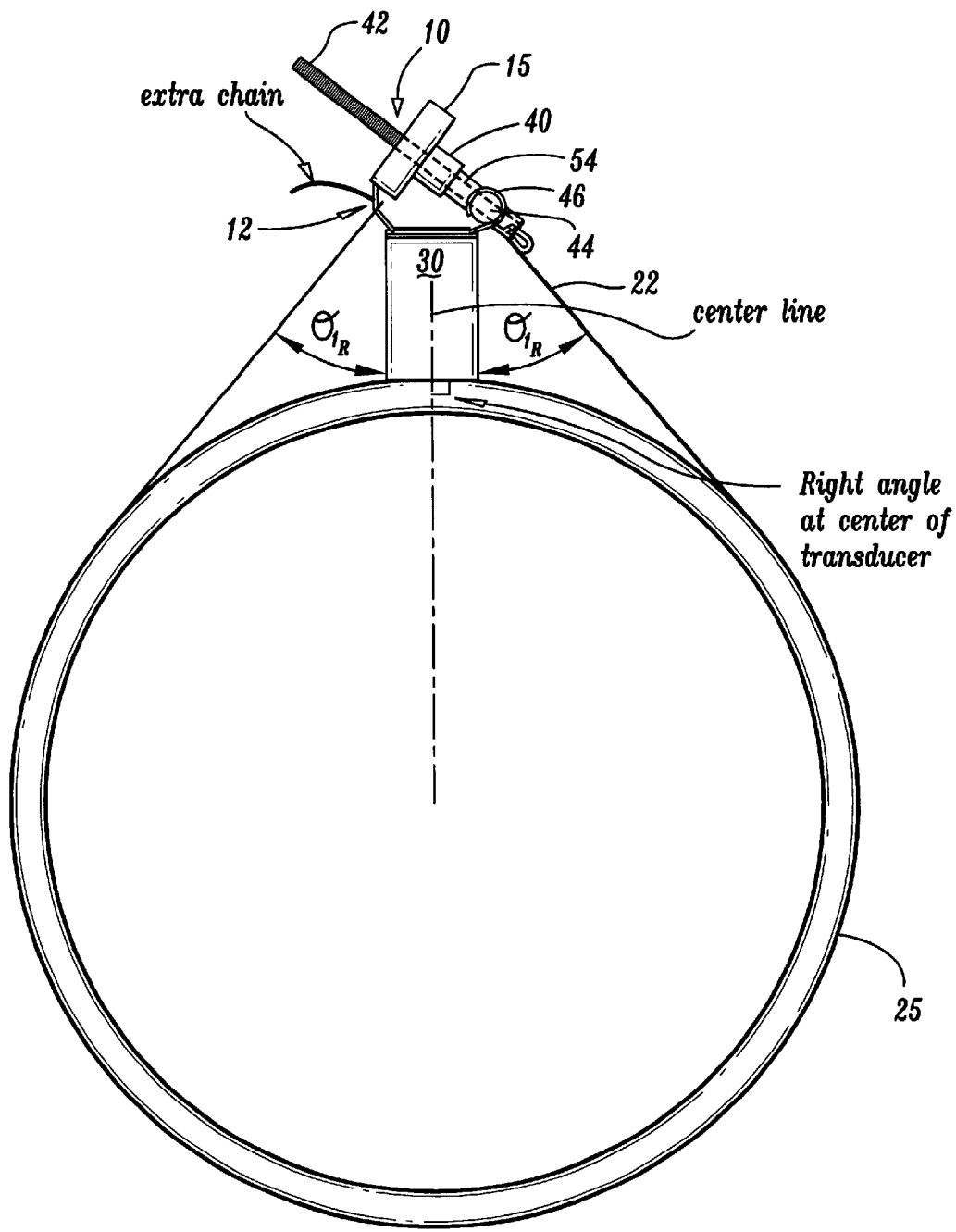
FIGS. 1A and 1B illustrate a turnbuckle assembly mounted on different sized pipes in accordance with the present invention.
Figure 1B:
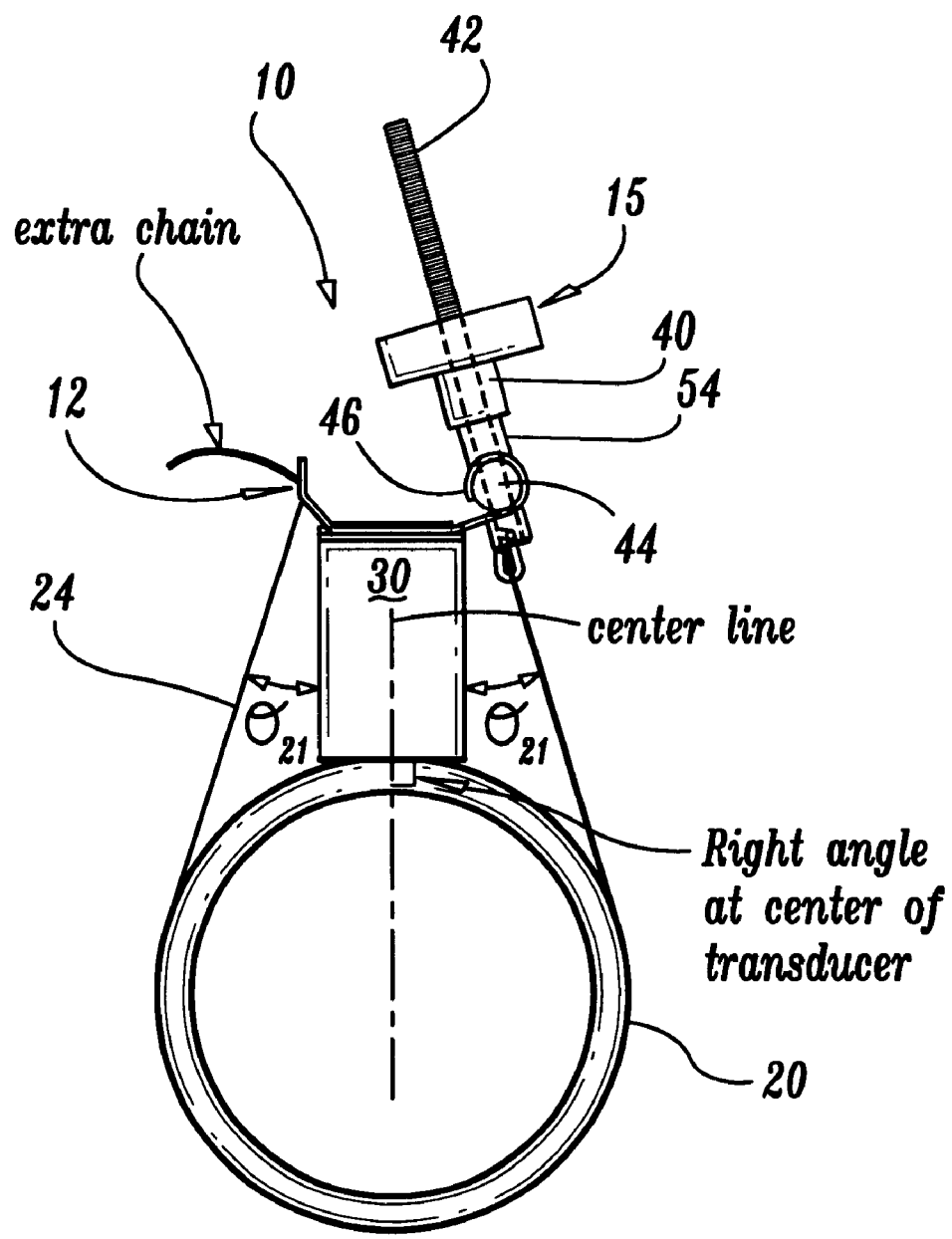

Referring now in specific detail to the drawings in which like reference numerals identify similar or identical elements throughout the several views, and initially to FIGS. 1A and 1B, a turnbuckle assembly 10 is illustrated. In particular, assembly 10 is shown clamping a transducer 30 to an illustratively small pipe 20 or a large pipe 25 via ladder chains 24 and 22, respectively. It is important to note that the turnbuckle assembly may be used to clamp numerous other devices or objects to any cylindrical shaped objects, and not just to clamp a transducer to a pipe, as shown. Further, it is also contemplated that the illustrative elements described herein may be replaced by other mechanisms and components for providing the same functions.

Figure 3:
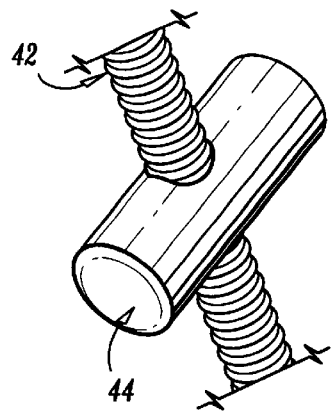
FIG. 3 illustrates a more detailed view of the spindle and threaded rod relationship of FIGS. 1A and 1B.
Figure 2:
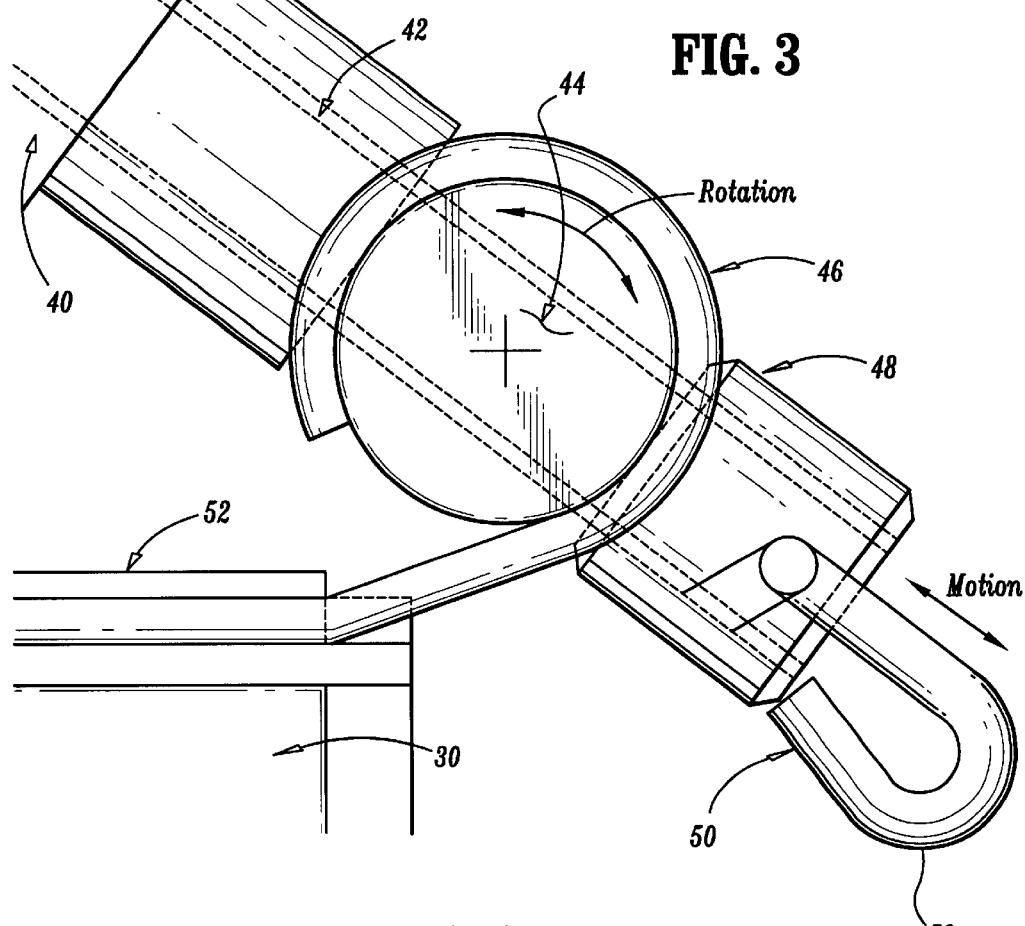
FIG. 2 illustrates a more detailed view of the turnbuckle assembly of FIGS. 1A and 1B.

Assembly 10 includes a threaded rod 42 that may be enclosed in a cylindrical tube (not shown), a threaded knob 40, formed of, e.g., metal or plastic, that rotates up and down rod 42 in a wormgear motion. Specifically, as shown in FIG. 3, rod 42 is positioned through spindle 44. Assembly 10 further includes a washer 54, formed of, e.g., a thick plastic, that provides a flat surface for the knob to apply a downward force on a rotatable spindle 44 and a collar 46 when tensioning the assembly. In addition, assembly 10 includes a fixed end nut 48 having a closed hook 58 for securing a link of ladder chain 22 or 24.

Collar 46, which is preferably formed of treated hardened steel, includes a flat retainer portion 52 (illustratively ½" wide), that is fixedly attached to the top of transducer 30 via screws or a tab (not shown), and an open hook portion 12 that secures the open end of ladder chain 22 or 24. Further, note that the collar 46 is split (not shown) around the spindle to allow the rod to pass therethrough and permit rotation of the rod.

In operation, transducer 30 is disposed on the outer surface of pipe 20 or 25 and the retainer 52 of assembly 10 is placed on the top surface of the transducer. Retainer 52 may be secured onto the transducer using screws or by including a tab that is inserted in a top center slot of the transducer. Next, chain 22 or 24, which is fixedly secured to closed hook 58 at one end 50, is placed around the circumference of the pipe and linked to open hook 12 on its other end leaving as little slack as possible.

Note that the position of the chain on the open hook is substantially on the same plane as the center axis of rotatable spindle 44.

To secure, the knob is rotated by hand clockwise which applies a force on washer 54 which, in turn, applies a force on collar 46 and spindle 44. Such force rotates spindle 44 clockwise, e.g., up to position 15, as collar 46 and spindle press against end nut 48.

Since the position of the chain on the open hook is substantially on the same plane as the center axis (axis of rotation) of rotatable spindle 44, the alignment of the transducer on the pipe is ensured. Further, the rotation of the spindle will assure that the chain's angle to the pipe is substantially equal on both sides of the pipe. That is the angle between the chain and the pipe will both be $\Theta_{12}$ for the large pipe and $\Theta_{21}$ for the small pipe.

In accordance with the present invention, a transducer can be clamped to a pipe very quickly while assuring that the transducer will align normal to the pipe with its centerline in contact with a pipe of any size.

Having described preferred embodiments for a device for clamping a transducer to a pipe (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed:

1. An apparatus for clamping and aligning an object to a cylinder comprising:

a retainer for attaching to the object, the retainer including an attachment device to detachably receive a flexible member and a collar disposed on an opposite side of the retainer;

a threaded rod having a first end portion, the first end portion adapted to receive a first end of the flexible member, the threaded rod attached to and transversely disposed to a spindle such that the first end portion extends beyond the spindle, the spindle being received in the collar to provide a hinged connection between the retainer and the threaded rod;

a knob for threadedly engaging a second end portion of the threaded rod; and a washer disposed between the knob and the collar wherein the knob is adjustable for tightening the flexible member around the cylinder for self aligning the object, and the threaded rod is pivoted about the collar for forming substantially equal angles between the flexible member and the cylinder on opposite sides of the object.

2. The apparatus as recited in claim 1, wherein the object is a transducer.

3. The apparatus as recited in claim 1, wherein the cylinder is a pipe.

4. The apparatus as recited in claim 1, wherein the flexible member is a chain.

5. The apparatus as recited in claim 1, wherein the flexible member is a ladder chain.

6. The apparatus as recited in claim 4, wherein the attachment device includes a hook for passing through and retaining a link of the chain.

7. The apparatus as recited in claim 1, wherein the retainer is secured to a top surface of the object.

8. The apparatus as recited in claim 7, wherein the threaded rod is disposed substantially perpendicular to the spindle.

9. The apparatus as recited in claim 1, wherein the object contacts the cylinder at a contact point, the contact point forming a tangential plane relative to the cylinder, the attachment device including a point of attachment for the flexible member at a location which is substantially coplanar with an axis of rotation provided by the spindle, the axis of rotation of the spindle and the point of attachment for the flexible member forming a second plane substantially parallel to the tangential plane.

10. An apparatus for clamping and aligning a transducer to a pipe comprising:

a retainer having an attachment structure for attaching the retainer to the transducer, the retainer including a hook for detachably receiving a chain, the retainer further including a collar disposed on an opposite side of the retainer relative to the hook;

a threaded rod having a first end portion, the first end portion adapted to receive a first end of the chain, the threaded rod attached to and transversely disposed to a spindle such that the first end portion extends beyond the spindle and receives a nut for rotatably securing the threaded rod to the collar, the spindle being received in the collar to provide a hinged connection between the retainer and the threaded rod;

a knob for threadedly engaging a second end portion of the threaded rod; and a washer disposed between the knob and the collar wherein the knob is adjustable for tightening the flexible member around the pipe for self aligning the transducer, and the threaded rod is pivoted about the collar for rotating in accordance with tension in the chain such that substantially equal angles are formed between the chain and the pipe on opposite sides of the transducer.

11. The apparatus as recited in claim 10, wherein the chain is a ladder chain.

12. The apparatus as recited in claim 10, wherein the retainer is secured to a top surface of the transducer.

13. The apparatus as recited in claim 10, wherein the threaded rod is disposed substantially perpendicular to the spindle.

14. The apparatus as recited in claim 10, wherein the transducer contacts the pipe at a contact point, the contact point forming a tangential plane relative to an outside diameter of the pipe, the hook including a point of attachment for the chain at a location which is substantially coplanar with an axis of rotation provided by the spindle, the axis of rotation of the spindle and the point of attachment for the chain forming a second plane substantially parallel to the tangential plane.

15. A method for clamping and aligning an object to a cyliner comprising the steps of:

providing an apparatus including a retainer for attaching to the object, the retainer including an attachment device for detachably receiving a flexible retaining member and a collar disposed on an opposite side of the retainer, a threaded rod having a first end portion, the first end portion adapted to receive a first end of the flexible retaining member, the threaded rod attached to and transversely disposed to a spindle such that the first end portion extends beyond the spindle, the spindle being received in the collar to provide a hinged connection between the retainer and the threaded rod, a knob for threadedly engaging a second end portion of the threaded rod and a washer disposed between the knob and the collar such that when the knob is adjusted the flexible member is tightened around the cylinder to self align the object, and the threaded rod is pivoted about the collar to form substantially equal angles between the flexible member and the cylinder on opposite sides of the object;

attaching the first end of the flexible retaining member to the first end portion of the threaded rod;

wrapping the flexible retaining member about the cylinder;

attaching a second portion of the flexible retaining member to the attachment device; and adjusting the knob to secure and align the object to the cylinder.

16. The method as recited in claim 15, wherein the cylinder includes a pipe.

17. The method as recited in claim 15, wherein the object includes a transducer.

18. The method as recited in claim 15, wherein the flexible retaining member includes a chain.

19. The method as recited in claim 15, wherein the step of wrapping the flexible retaining member about the cylinder includes the step of removing slack from the flexible retaining member before the step of attaching the second portion of the flexible retaining member to the attachment device.

20. The method as recited in claim 15, wherein the step of wrapping the flexible retaining member about the cylinder includes the step of adjusting a length of the flexible retaining member to accommodate a plurality of different size cylinders.

21. An apparatus for clamping and aligning an object to a cylinder comprising:

a retainer for attaching to the object, the retainer including:
an attachment device to detachably receive a flexible member, and
a collar disposed on an opposite side of the retainer from the attachment device; and an adjustment device having a first end portion, the first end portion adapted to receive a first end of the flexible member, the adjustment device being attached to and transversely disposed to a spindle such that the first end portion extends beyond the spindle, the spindle being received in the collar to provide a hinged connection between the retainer and the adjustment device, the adjustment device including an adjustment mechanism for tightening the flexible member around the cylinder for self aligning the object, and the adjustment device being pivoted about the collar for forming substantially equal angles between the flexible member and the cylinder on opposite sides of the object.

22. The apparatus as recited in claim 21, wherein the object is a transducer.

23. The apparatus as recited in claim 21, wherein the cylinder is a pipe.

24. The apparatus as recited in claim 21, wherein the flexible member is a chain.

25. The apparatus as recited in claim 24, wherein the attachment device includes a hook for passing through and retaining a link of the chain.

26. The apparatus as recited in claim 21, wherein the retainer is secured to a top surface of the object.

27. The apparatus as recited in claim 26, wherein the adjustment device is disposed substantially perpendicular to the spindle.

28. The apparatus as recited in claim 21, wherein the object contacts the cylinder at a contact point, the contact point forming a tangential plane relative to the cylinder, the attachment device including a point of attachment for the flexible member at a location which is substantially coplanar with an axis of rotation provided by the spindle, the axis of rotation of the spindle and the point of attachment for the flexible member forming a second plane substantially parallel to the tangential plane.

29. A method for clamping and aligning an object to a cylinder comprising the steps of:

providing an apparatus including a retainer for attaching to the object, the retainer including an attachment device to detachably receive a flexible member, and a collar disposed on an opposite side of the retainer, and an adjustment device having a first end portion, the first end portion adapted to receive a first end of the flexible member, the adjustment device being attached to and transversely disposed to a spindle such that the first end portion extends beyond the spindle, the spindle being received in the collar to provide a hinged connection between the retainer and the adjustment device, the adjustment device including an adjustment mechanism for tightening the flexible member around the cylinder for self aligning the object, and the adjustment device being pivoted about the collar for forming substantially equal angles between the flexible member and the cylinder on opposite sides of the object;

attaching the first end of the flexible member to the first end portion of the adjustment device;

wrapping the flexible member about the cylinder;

attaching a second portion of the flexible member to the attachment device; and adjusting the adjustment mechanism to secure and align the object to the cylinder.

30. The method as recited in claim 29, wherein the step of wrapping the flexible member about the cylinder includes the step of adjusting a length of the flexible member to accommodate a plurality of different size cylinders.

* * * * *